US006398982B1

(12) United States Patent
Hofer et al.

(10) Patent No.: US 6,398,982 B1
(45) Date of Patent: Jun. 4, 2002

(54) COMPOSITION FOR THE TREATMENT TEXTILES

(75) Inventors: Urs Hofer, Basel; Werner Kaufmann, Rheinfelden; Manfred Rembold, Pfeffingen, all of (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/716,553

(22) Filed: Nov. 20, 2000

Related U.S. Application Data

(62) Division of application No. 08/361,257, filed on Dec. 21, 1994, now Pat. No. 6,174,854.

(30) Foreign Application Priority Data

Dec. 23, 1993 (GB) ............................................ 9326358

(51) Int. Cl.[7] ............................................... C09K 11/06
(52) U.S. Cl. .................................. 252/301.23; 510/516
(58) Field of Search ...................... 510/516; 252/301.23

(56) References Cited

U.S. PATENT DOCUMENTS

| | | | | |
|---|---|---|---|---|
| 3,118,887 | A | 1/1964 | Hardy et al. | 260/248 |
| 3,259,627 | A | 7/1966 | Duennenberger et al. | 260/248 |
| 3,293,247 | A | 12/1966 | Duennenberger et al. | 260/248 |
| 3,382,183 | A | 5/1968 | Donalan et al. | 252/300 |
| 3,423,360 | A | 1/1969 | Huber et al. | 260/47 |
| 4,127,586 | A | 11/1978 | Rody et al. | 260/308 B |
| 4,141,903 | A | 2/1979 | Adler | 260/308 B |
| 4,230,867 | A | 10/1980 | Kintopf et al. | 548/260 |
| 4,460,374 | A | 7/1984 | Abel et al. | 8/501 |
| 4,675,352 | A | 6/1987 | Winter et al. | 524/91 |
| 4,698,064 | A | 10/1987 | Evans et al. | 8/128 R |
| 4,937,349 | A | 6/1990 | Burdeska et al. | 548/26 |
| 4,950,304 | A | 8/1990 | Reinert et al. | 8/566 |
| 4,964,871 | A | 10/1990 | Reinert et al. | 8/115.59 |
| 5,037,979 | A | 8/1991 | Höhener et al. | 544/216 |
| 5,134,223 | A | 7/1992 | Langer et al. | 528/272 |
| 5,142,059 | A | 8/1992 | Burdeska et al. | 548/260 |
| 5,143,729 | A | 9/1992 | Thompson | 424/402 |
| 5,197,991 | A | 3/1993 | Rembold | 8/490 |
| 5,374,362 | A | 12/1994 | McFarland | 252/8.6 |
| 5,474,691 | A | 12/1995 | Severns | 252/8.9 |

FOREIGN PATENT DOCUMENTS

| | | |
|---|---|---|
| BE | 643898 | 8/1964 |
| EP | 0058637 | 8/1982 |
| EP | 0310083 | 4/1989 |
| EP | 0314620 | 5/1989 |
| EP | 0345212 | 12/1989 |
| EP | 0357545 | 3/1990 |
| GB | 2174731 | 11/1986 |
| JP | 162798 | 7/1988 |
| WO | 86/02392 | 4/1986 |
| WO | 89/03826 | 5/1989 |
| WO | 91/10006 | 7/1991 |
| WO | 94/04515 | 3/1994 |
| WO | 96/03481 | 2/1996 |
| WO | 96/03486 | 2/1996 |

OTHER PUBLICATIONS

Derwent Abstract 88–230562/33 for JP 630162798.

Chem. Abstr. vol. 109, No. 24, Dec. 12, 1988, 212841u, for JP 630162798.

Tenside, vol. 30, No. 6, Nov. 1993, pp. 394–399.

Seifen–Öle–Fetti–Wachse, vol. 109, No. 6, Apr. 1983, pp. 143–148.

McCutcheon's vol. 1: Emulsifiers & Detergents, North American Edition, (1994) pp. 12, 13, 198, 294,295.

McCutcheon's vol. 2: Functional Materials, North American Edition, (1994) pp. 46–50.

*Primary Examiner*—John Hardee
(74) *Attorney, Agent, or Firm*—Kevin T. Mansfield

(57) ABSTRACT

There is provided a stable, concentrated fabric rinse composition comprising 0.1 to 20, preferably 1 to 10% by weight of a UV absorber selected from a hydroxyaryl-1,3,5-triazine, a sulphonated-1,3,5-triazine, an o-hydroxyphenylbenzotriazole or a 2-aryl-2H-benzotriazole, based on the total weight of the composition, and a fabric care ingredient, preferably a fabric softener, a stain release or stain repellant ingredient or a water-proofing agent, the remainder being substantially water. The fabric rinse composition is preferably a fabric softener composition comprising 5 to 25, preferably 10 to 20% by weight of a cationic fabric softening agent and 0.1 to 20, preferably 1 to 10% by weight of a UV absorber selected from a hydroxyaryl-1,3,5-triazine, a sulphonated-1,3,5-triazine, an o-hydroxyphenylbenzotriazole or a 2-aryl-2H-benzotriazole, each based on the total weight of the composition, the remainder being substantially water. The present invention also provides method for the treatment of a textile article, comprising applying, to the previously washed article, the said fabric rinse composition, preferably the rinse cycle fabric softener composition, whereby the SPF value of articles so treated can be significantly increased.

38 Claims, No Drawings

COMPOSITION FOR THE TREATMENT TEXTILES

This is a divisional of application Ser. No. 08/361,257 filed Dec. 12, 1994 U.S. Pat. No. 6,174,854.

The present invention relates to a composition for the treatment of textiles, in particular to a fabric care composition containing a UV absorber, and to a method of treating textiles with the composition, which method imparts to textile fibre material so treated, in addition to an excellent sun protection factor (SPF) value, and other desirable properties.

It is known that light radiation of wavelengths 280–400 nm permits tanning of the epidermis. Also known is that rays of wavelengths 280–320 nm (termed UV-B radiation), cause erythemas and skin burning which can inhibit skin tanning.

Radiation of wavelengths 320–400 nm (termed UV-A radiation) is known to induce skin tanning but can also cause skin damage, especially to sensitive skin which is exposed to sunlight for long periods. Examples of such damage include loss of skin elasticity and the appearance of wrinkles, promotion of the onset of erythemal reaction and the inducement of phototoxic or photoallergic reactions.

Any effective protection of the skin from the damaging effects of undue exposure to sunlight clearly needs to include means for absorbing both UV-A and UV-B components of sunlight before they reach the skin surface.

Traditionally, protection of exposed human skin against potential damage by the UV components in sunlight has been effected by directly applying to the skin a preparation containing a UVA. In areas of the world, e.g. Australia and America, which enjoy especially sunny climates, there has been a great increase in the awareness of the potential hazards of undue exposure to sunlight, compounded by fears of the consequences of alleged damage to the ozone layer. Some of the more distressing embodiments of skin damage caused by excessive, unprotected exposure to sunlight are development of melanomas or carcinomas on the skin.

One aspect of the desire to increase the level of skin protection against sunlight has been the consideration of additional measures, over and above the direct protection of the skin.

For example, consideration has been given to the provision of protection to skin covered by clothing and thus not directly exposed to sunlight.

Most natural and synthetic textile materials are at least partially permeable to UV components of sunlight. Accordingly, the mere wearing of clothing does not necessarily provide skin beneath the clothing with adequate protection against damage by UV radiation. Although clothing containing a deeply coloured dye and/or having a tight weave texture may provide, a reasonable level of protection to skin beneath it, such clothing is not practical in hot sunny climates, from the standpoint of the personal comfort of the wearer.

There is a need, therefore, to provide protection against UV radiation for skin which lies underneath clothing, including lightweight summer clothing, which is undyed or dyed only in pale shades. Depending on the nature of the dyestuff, even skin beneath clothing dyed in some dark shades may also require protection from UV radiation.

Such lightweight summer clothing normally has a density of of less than 200 $g/m^2$ and has a sun protection factor rating between 1.5 and 20, depending on the type of fibre from which the clothing is manufactured.

The SPF rating of a sun protectant (sun cream or clothing) may be defined as the multiple of the time taken :or the average person wearing the sun protectant to suffer sun burning under average exposure to sun. For example, if an average person would normally suffer sun bum after 30 minutes under standard exposure conditions, a sun protectant having an SPF rating of 5 would extend the period of protection from 30 minutes to 2 hours and 30 minutes. For people living in especially sunny climates, where mean sun burn times are minimal, e.g. only 15 minutes for an average fair-skinned person at the hottest time of the day, SPF ratings of about 20 are desired for lightweight clothing.

The selection of a suitable UVA, for use in a method for effecting an increase in the SPF value of a textile fibre material (often referred to as a "U cutting" treatment method), has to take into account the fact that the treated textile fibre material must satisfy performance criteria in a wide range of areas, such as washfastness, lightfastness and tear resistance, apart from its SPF value.

For example, the currently known non-reactive UVAs generally exhibit an inadequate washfastness when applied to cotton. Consequently, their use in UV cutting applications (and also for the purpose of improving the lightfastness) is limited.

It is already known from WO 86/2392, that a fabric softening composition may comprise:

a) 20–89.9% by weight of a specified alkoxylated β-sitosterol;

b) 10–79.9% by weight of di($C_{12}$–$C_{22}$-alkyl) dimethylammonium chloride or a specified imidazoline derivative;

c) 0.01–10% by weight of a UV-absorber; and d) 0–10% by weight of one or more additives. The specified alkoxylated β-sitosterol components of these known compositions appear to be rather inaccessible compounds which are not commercially available. Moreover, the specific UV-absorbers described in WO 86/2392, with the exception of 2-hydroxy-4-cyanobenzophenone are, in fact, fluorescent whitening agents rather than UV-absorbers.

Surprisingly, it has now been found that by applying, to a washed article of clothing, a rinse cycle fabric care formulation comprising a specific UV absorber, especially a rinse cycle fabric softener comprising a specific UV absorber, the SPF factor of clothing so treated can be significantly increased, without the need to include an alkoxylated β-sitosterol in the rinse cycle fabric care formulation.

The present invention provides, therefore, as a first aspect, a stable, concentrated fabric rinse composition comprising:

a) 0.1 to 20, preferably 1 to 10% by weight of a UV absorber selected from a hydroxyaryl-1,3,5triazine, a sulphonated-1,3,5-triazine, an o-hydroxyphenylbenzotriazole or a 2-aryl-2H-benzotriazole, based on the total weight of the composition;

b) a fabric care ingredient, preferably a fabric softener, a stain release or stain repellant ingredient of a waeter-proofing agent; and c) the remainder being substantially water.

The fabric care ingredient is preferably present in an amount of from 5 to 25, preferably 10 to 20% by weight, based on the total weight of the composition.

The present invention provides, as a second aspect, a stable, concentrated rinse cycle fabric softener composition comprising:

a) 0.1 to 20, preferably 1 to 10% by weight of a UV absorber selected from a hydroxyaryl-1,3,5-triazine, a sulphonated-1,3,5-triazine, an o-hydroxyphenylbenzotriazole or a 2-aryl-2H-benzotriazole, based on the total weight of the composition;

b) 5 to 25, preferably 10 to 20% by weight of a cationic fabric softening agent based on the total weight of the composition; and c) the remainder being substantially water.

Preferred examples of cationic fabric softening agents include imidazolines and quaternary ammonium compounds as well as mixtures thereof.

Preferred imidazoline cationic fabric softening agents are those having the formula:

(1)

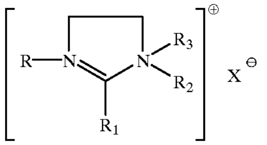

in which R is hydrogen or $C_1$–$C_4$alkyl; $R_1$ is a $C_8$–$C_{30}$aliphatic residue; $R_2$ is hydrogen, a $C_8$–$C_{30}$aliphatic residue, $C_1$–$C_4$alkyl, $C_1$–$C_4$halogenoalkyl, $C_1$–$C_4$hydroxyalkyl or a group —$C_2H_4$—OC(═O)—$R_5$ or —$C_2H_4$—N($R_4$)—C(═O)—$R_5$ in which $R_4$ is hydrogen or $C_8$–$C_{10}$alkyl an $R_5$ is hydrogen or $C_1$–$C_4$alkyl; $R_3$ is a $C_8$–$C_{30}$aliphatic residue, $C_1$–$C_4$alkyl, $C_1$–$C_4$halogenoalkyl, $C_1$–$C_4$hydroxyalkyl or a group —$C_2H_4$—OC(═O)—$R_5$ or —$C_2H_4$—N($R_4$)—C(═O)—$R_5$ in which $R_4$ and $R_5$ have their previous significance; and X is an anion.

Preferably R is hydrogen or methyl; $R_1$ is $C_{14}$–$C_{18}$alkyl or $C_{14}$–$C_{18}$alkenyl; $R_2$ is hydrogen, $C_{14}$–$C_{18}$alkyl, $C_{14}$–$C_{18}$alkenyl, $C_1$–$C_4$alkyl, $C_1$–$C_4$halogenoalkyl or $C_1$–$C_4$hydroxyalkyl; and $R_3$ is a group —$C_2H_4$—OC(═O)—$R_5$ or —$C_2H_4$—N($R_4$)—C(═O)—$R_5$ in which $R_4$ is hydrogen or $C_8$–$C_{30}$alkyl and $R_5$ is hydrogen or $C_1$–$C_4$alkyl.

Preferred anions X include chloride, bromide, iodide, fluoride, sulfate, methosulfate, nitrite, nitrate or phosphate anions, as well as carboxylate anions such as acetate, adipate, phthalate, benzoate, stearate or oleate anions.

Specific examples of preferred compounds of formula (1) include:

2-tallow-1-(2-stearoyloxyethyl)-imidazoline chloride,
2-tallow-1-(2-stearoyloxyethyl)-imidazoline sulfate,
2-tallow-1-(2-stearoyloxyethyl)-imidazoline methosulfate,
2-tallow-1-methyl-3-(2-stearoylamidoethyl)-imidazoline chloride,
2-tallow-1-methyl-3-(2-stearoylamidoethyl)-imidazoline sulfate,
2-tallow-1-methyl-3-(2-stearoylamidoethyl)-imidazoline methosulfate,
2-heptadecyl-1-methyl-1-oleylamidoethyl-imidazolinium-metho-sulfate,
2-heptadecyl-1-methyl-1-(2-stearoylamido)ethyl-imidazolinium-sulfate,
2-heptadecyl-1-methyl-1-(2-stearoylamido)ethyl-imidazolinium-chloride
2-coco-1-(2-hydroxyethyl)-1-benzyl-imidazolinium-chloride
2-coco-1-(2-hydroxyethyl)-1-(4-chlorobutyl)-imidazolinium-chloride
2-coco-1-(2-hydroxyethyl)-1-octadecenyl-imidazolinium-chloride
2-tallow-1-(2-hydroxyethyl)-1-benzyl-imidazolinium-chloride
2-tallow-1-(2-hydroxyethyl)-1-(4-chlorobutyl)-imidazolinium-chloride
2-heptadecenyl-1-(2-hydroxyethyl)1-(4-chlorobutyl)-imidazolinium-chloride
2-heptadecenyl-1-(2-hydroxyethyl)-1-benzyl-imidazolinium-chloride and
2-heptadecenyl-1-(2-hydroxyethyl)-1-octadecyl-imidazolinium-chloride One class of preferred quaternary ammonium compounds is that having the formula:

(2)

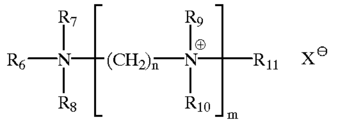

in which $R_6$ is a $C_8$–$C_{30}$aliphatic residue, $R_7$, $R_8$, $R_9$, $R_{10}$ and $R_{11}$, independently, are hydrogen, $C_1$–$C_4$alkyl or $C_1$–$C_4$hydroxyalkyl, X has its previous significance, m is an integer from 1 to 5 and n is an integer from 2 to 6.

Preferred compounds of formula (2) are those in which $R_6$ is $C_{12}$–$C_{18}$alkyl and $R_7$, $R_8$, $R_9$, $R_{10}$ and $R_{11}$, independently, are $C_1$–$C_4$alkyl, especially methyl.

Specific examples of preferred compounds of formula (2) are:

N-(tallow)-N,N,N',N'-tetramethyl-1,3-propanediammoniumdimethosulfate
N-(tallow)-N,N',N'-trimethyl-1,3-propanediammoniumdimethosulfate
N-(tallow)-N,N,N',N',N'-pentamethyl-1,3-propanediammoniumdimethosulfate
N-oleyl-N,N,N',N',N'-pentamethyl-1,3-propanediammoniumdimethosulfate
N-stearyl-N,N,N',N',N'-pentamethyl-1,3-propanediammoniumdimethosulfate and
N-stearyloxypropyl-N,N',N'-tris(3-hydroxypropyl)-1,3-propanediammoniumdiacetate.

A further class of preferred quaternary ammonium compounds is that having the formula:

(3)

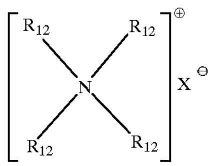

in which X has its previous significance and the groups $R_{12}$ may be the same or different and each is a $C_1$–$C_{30}$aliphatic residue, provided that at least one group $R_{12}$, and preferably two groups $R_{12}$ are $C_{14}$–$C_{30}$alkyl. Preferably, the remaining groups $R_{12}$ are $C_1$–$C_4$alkyl, especially methyl or ethyl.

Specific preferred compounds of formula (3) are:

distearyldimethylammonium chloride
dilauryldimethylammonium chloride
dihexadecyldimethylammonium chloride
distearyldimethylammonium bromide
distearyldimethylammonium methosulfate and
distearyldi-(isopropyl)-ammonium chloride.

The UV absorber used readily absorbs UV light, especially in the range λ=300 to 400 nm, and converts the absorbed energy, by a chemical intermediate reaction, into non-interfering, stable compounds or into non-interfering forms of energy. The UV absorber used should, of course, be compatible with the rinse cycle fabric softener composition. Preferably, the UV absorber used is one which is capable of being absorbed on to the washed textile article during a rinse cycle fabric softener treatment.

Such known UV absorbers for use in the present invention are described, for example, in the U.S. Pat. Nos. 3,118,887, 3,259,627, 3,293,247, 3,382,183, 3,423,360, 4,127,586, 4,141,903, 4,230,867, 4,675,352 and 4,698,064.

One preferred class of triazine UV absorbers is that having the formula:

(4)

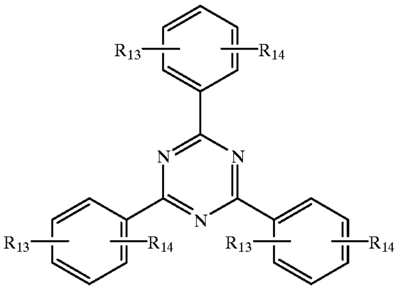

in which $R_{13}$ and $R_{14}$, independently, are hydrogen, hydroxy or $C_1$–$C_5$alkoxy.

A second preferred class of triazine UV absorbers is that having the formula:

(5)

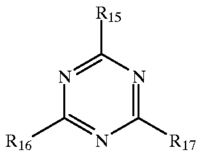

in which at least one of $R_{15}$, $R_{16}$ and $R_{17}$ is a radical of formula:

(6)

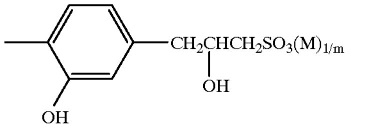

in which M is hydrogen, sodium, potassium, calcium, magnesium, ammonium, mono-, di-, tri- or tetra-$C_1$–$C_4$alkylammonium, mono-, di- or tri-$C_1$–$C_4$hydroxyalkylammonium or ammonium that is di- or tri-substituted by a mixture of $C_1$–$C_4$alkyl and $C_1$–$C_4$hydroxyalkyl groups; m is 1 or 2; and the remaining substituent(s) $R_{15}$, $R_{16}$ and $R_{17}$ are, independently, amino, $C_1$–$C_{12}$alkyl, $C_1$–$C_{12}$alkoxy, $C_1$–$C_{12}$alkylthio, mono- or di-$C_1$–$C_{12}$alkylamino, phenyl, phenylthio, anilino or N-phenyl-N—$C_1$–$C_4$alkylamino, preferably N-phenyl-N-methylamino or N-phenyl-N-ethylamino, the respective phenyl substituents being optionally substituted by $C_1$–$C_{12}$alkyl or -alkoxy, $C_5$–$C_8$cycloalkyl or halogen.

A third preferred class of triazine UV absorbers is that having the formula:

(7)

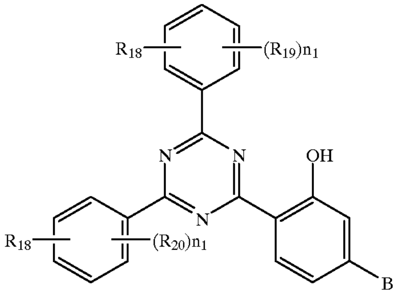

in which $R_{18}$ is hydrogen or hydroxy; $R_{19}$ and $R_{20}$, independently, are hydrogen or $C_1$–$C_4$alkyl; $n_1$ is 1 or 2; and B is a group of formula:

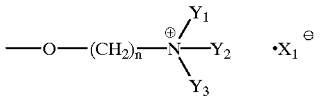

in which n has its previous significance and is preferably 2 or 3; $Y_1$ and $Y_2$, independently, are $C_1$–$C_4$alkyl optionally substituted by halogen, cyano, hydroxy or $C_1$–$C_4$alkoxy or $Y_1$ and $Y_2$, together with the nitrogen atom to which they are each attached, form a 5–7 membered heterocyclic ring, preferably a morpholine, pyrrolidine, piperidine or hexamethyleneimine ring; $Y_3$ is hydrogen, $C_3$–$C_4$alkenyl or $C_1$–$C_4$alkyl optionally substituted by cyano, hydroxy or $C_1$–$C_4$alkoxy or $Y_1$, $Y_2$ and $Y_3$, together with the nitrogen atom to which they are each attached, form a pyridine or picoline ring, and $X_1$, is a colourless anion, preferably $CH_3OSO_3^{\ominus}$ or $C_2H_5OSO_3^{\ominus}$.

One preferred class of triazole WV absorbers is that having the formula:

(8)

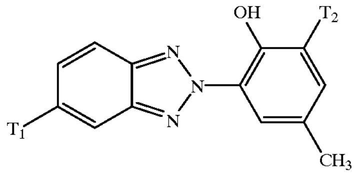

in which $T_1$ is chlorine or, preferably, hydrogen; and $T_2$ is a $C_8$–$C_{30}$, preferably $C_8$–$C_{16}$, especially $C_9$–$C_{12}$alkyl group. $T_2$ may be a random statistical mixture of at least three isomeric branched sec. $C_8$–$C_{30}$, preferably $C_8$–$C_{16}$, especially $C_9$–$C_{12}$alkyl groups, each having the formula —$CH(E_1)E_2$ in which $E_1$ is a straight chain $C_1$–$C_4$alkyl group and $E_2$ is a straight chain $C_4$–$C_{15}$alkyl group, the total number of carton atoms in $E_1$ and $E_2$ being from 7 to 29.

A second preferred class of triazole UV absorbers is that having the formula:

(9)

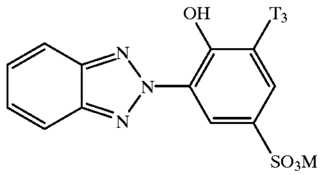

in which M has its previous significance, but is preferably sodium, and $T_3$ is hydrogen, $C_1$–$C_{12}$alkyl or benzyl.

A third preferred class of triazole UV absorbers is that having the formula:

(10)

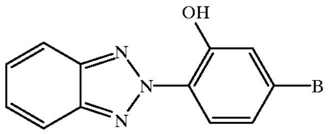

in which B has its previous significance.

In the compounds of formulae (4) to (9), $C_1$–$C_{12}$Alkyl groups $R_{15}$, $R_{16}$, $R_{17}$ and $T_3$ may be methyl, ethyl, n-propyl, isopropyl, n-butyl, isobutyl, tert.-butyl,n-amyl, n-hexyl, n-heptyl, n-octyl, isooctyl, n-nonyl, n-decyl, n-undecyl and n-dodecyl, methyl and ethyl being preferred, except in the case of $T_3$ for which isobutyl is preferred. $C_8$–$C_{30}$alkyl groups $T_2$ include sec.octyl, decyl, dodecyl, tridecyl, tetradecyl, hexadecyl, octadecyl, eicosyl and triacontyl groups.

$C_1$–$C_5$Alkoxy groups $R_{13}$ or $R_{14}$ may be, e.g., methoxy, ethoxy, n-propoxy, isopropoxy, n-butoxy, isobutoxy, tert.-butoxy or n-amyloxy, preferably methoxy or ethoxy, especially methoxy. $C_1$–$C_{12}$Alkoxy groups $R_{15}$, $R_{16}$ and $R_{17}$ include those indicated for the $C_1$–$C_5$alkoxy groups $R_{13}$ or $R_{14}$ together with, e.g., n-hexoxy, n-heptoxy, n-octoxy, isooctoxy, n-nonoxy, n-decoxy, n-undecoxy and n-dodecoxy, methoxy and ethoxy being preferred.

$C_1$–$C_{12}$Alkylthio groups $R_{15}$, $R_{16}$ and $R_{17}$ may be, e.g., methylthio, ethylthio, n-propylthio, isopropylthio, n-butylthio, isobutylthio, tert.-butylthio, n-amylthio, hexylthio, n-heptylthio, n-octylthio, isooctylthio, n-nonylthio, n-decylthio, n-undecylthio and n-dodecylthio, methylthio and ethylthio being preferred.

$C_1$–$C_{12}$Mono- or di-alkylamino groups $R_{15}$, $R_{16}$ and $R_{17}$ include, e.g., mono- or di-methylamino, ethylamino, n-propylamino, isopropylamino, n-butylamino, isobutylamino, tert.-butylamino, n-amylamino, n-hexylamino, n-heptylamino, n-octylamino, isooctylamino, n-nonylamino, n-decylamino, n-undecylamino and n-dodecylamino, mono- or di-methylamino or ethylamino being preferred.

The alkyl radicals in the mono-, di-, tri- or tetra-$C_1$–$C_4$alkylammonium groups M are preferably methyl. Mono-, di- or tri-$C_1$–$C_4$hydroxyalkylammonium groups M are preferably those derived from ethanolamine, di-ethanolamine or tri-ethanolamine. When M is ammonium that is di- or tri-substituted by a mixture of $C_1$–$C_4$alkyl and $C_1$–$C_4$hydroxyalkyl groups, it is preferably N-methyl-N-ethanolamine or N,N-dimethyl-N-ethanolamine. M is preferably, however, hydrogen or sodium.

Preferred compounds of formula (4) are those having the formulae:

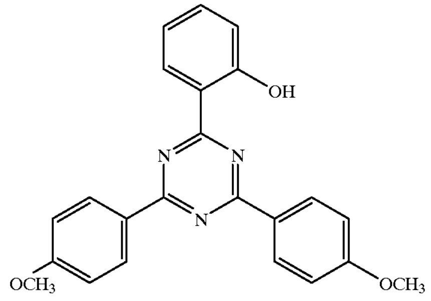

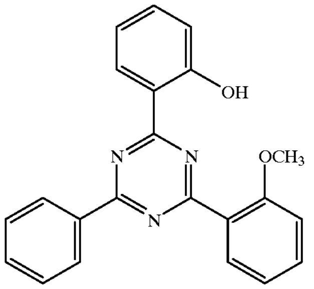

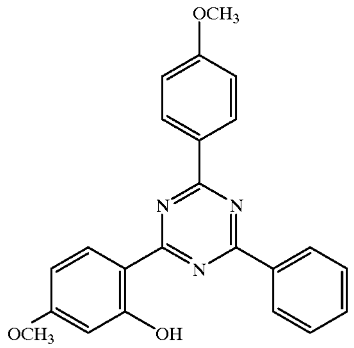

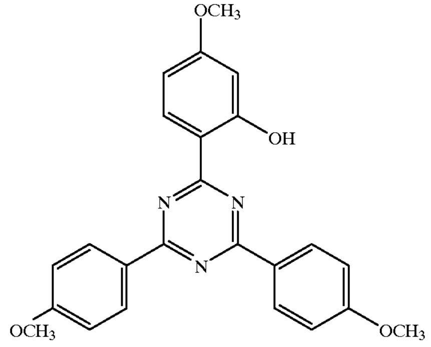

-continued (15)

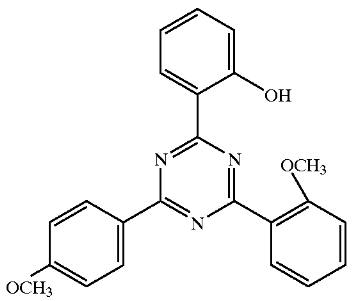

(16)

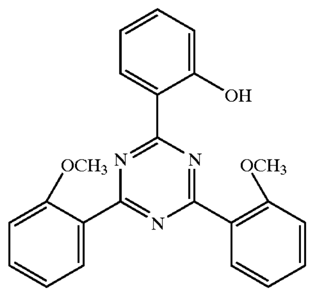

(17)

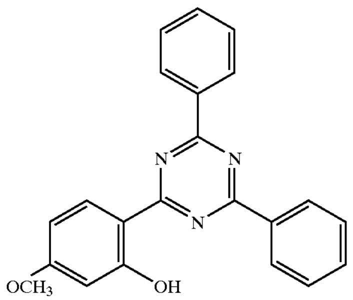

The compounds of formula (4) are known and may be prepared e.g. by the method described in U.S. Pat. No. 3,118,887.

Preferred compounds of formula (5) are those having the formula:

(18)

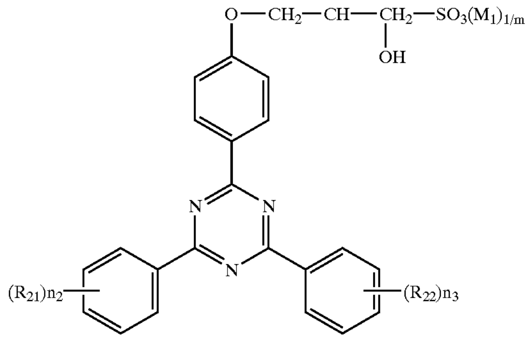

in which $R_{21}$ and $R_{22}$, independently, are $C_1$–$C_{12}$alkyl, preferably methyl; m is 1 or 2; $M_1$ is hydrogen, sodium, potassium, calcium, magnesium, ammonium or tetra-$C_1$–$C_{12}$alkylammonium, preferably hydrogen; and $n_2$ and $n_3$, independently, are 0, 1 or 2, preferably 1 or 2.

Particularly preferred compounds of formula (18) are:

2,4-diphenyl-6-[2-hydroxy-4-(2-hydroxy-3-sulfopropoxy)-phenyl]-1,3,5-triazine;

2-phenyl-4,6-bis-[2-hydroxy-4-(2-hydroxy-3-sulfopropoxy)- phenyl]-1,3,5-triazine;

2,4-bis(2,4-dimethylphenyl)-6-[2-hydroxy-4-(2-hydroxy-3-sulfopropoxy)-phenyl]-1,3,5-triazine; and 2,4-bis(4methylphenyl)-6-[2-hydroxy-4-(2-hydroxy-3-sulfopropoxy)-phenyl]-1,3,5-triazine.

The compounds of formula (5) are known and may be prepared in the manner, e.g., described in U.S. Pat. No. 5,197,991.

The compounds of formula (8) are known and may be prepared in the manner, e.g., described in U.S. Pat. No. 4,675,352.

The compounds of formula (9) are known and may be prepared in the manner, e.g., described in EP-A-0 314 620.

The compounds of formula (10) are known and may be prepared in the manner, e.g., described in EP-A-0 357 545.

Some of the UV absorbers used in the method of the present invention may be only sparingly soluble in water and may need to be applied in dispersed form. For this purpose, they may be milled with an appropriate dispersant, conveniently using quartz balls and an impeller, down to a particle size of 1–2 microns.

As dispersing agents for such sparingly-soluble UV absorbers there may be mentioned: acid esters or their salts of alkylene oxide adducts, e.g., acid esters or their salts of a polyadduct of 4 to 40 moles of ethylene oxide with 1 mole of a phenol, or phosphoric acid esters of the adduct of 6 to 30 moles of ethylene oxide with 1 mole of 4-nonylphenol, 1 mole of dinonylphenol or, especially, with 1 mole of compounds which have been produced by the addition of 1 to 3 moles of styrenes on to 1 mole of phenol;

polystyrene sulphonates;

fatty acid taurides;

alkylated diphenyloxide-mono- or -di-sulphonates;

sulphonates; of polycarboxylic acid esters;

addition products of 1 to 60, preferably 2 to 30 moles of ethylene oxide and/or propylene oxide on to fatty amines, fatty amides, fatty acids or fatty alcohols, each having 8 to 22 carbon atoms, or on to tri- to hexavalent $C_3$–$C_6$alkanols, the addition products having been converted into an acid ester with an organic dicarboxylic acid or with an inorganic polybasic acid;

lignin sulphonates; and, in particular formaldehyde condensation products, e.g., condensation products of lignin sulphonates and/or phenol and formaldehyde; condensation products of formaldehyde with aromatic sulphonic acids, e.g., condensation products of ditolylethersulphonates and formaldehyde; condensation products of naphthalenesulphonic acid and/or naphthol- or naphthylaminesulphonic acids and formaldehyde; condensation products of phenolsulphonic acids and/or sulphonated dihydroxydiphenylsulphone and phenols or cresols with formaldehyde and/or urea; or condensation products of diphenyloxide-disulphonic acid derivatives with formaldehyde.

In addition to the UV absorber, the composition according to the present invention may also contain a minor proportion of one or more adjuvants. Examples of adjuvants include emulsifiers, perfumes, colouring dyes, opacifiers, fluorescent whitening agents, bactericides, nonionic surfactants, anti-gelling agents such as nitrites or nitrates of alkali metals, especially sodium nitrate, and corrosion inhibitors such as sodium silicate.

The amount of each of these optional adjuvants preferably ranges from 0.05 to 5% by weight of the composition.

A particularly preferred optional adjuvant is a cationic, amphoteric or anionic fluorescent whitening agent.

The cationic fluorescent whitening agent is preferably of the bistyrylphenyl class or phosphinic acid salt class; the amphoteric fluorescent whitening agent is preferably of the styrene or amine, oxide class; and the anionic fluorescent whitening agent is preferably of the aminostilbene, dibenzofuranylbiphenyl or bistyrylphenyl class.

One preferred class of cationic bistyrylphenyl fluorescent whitening agent is that having the formula:

(20)

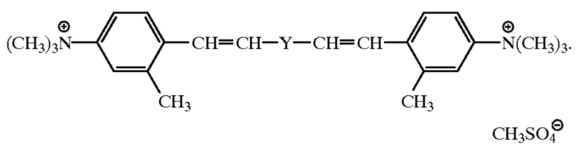

The compound; of formula (19) and their production are described in U.S. Pat. No. 4,009,193.

A further prefer red class of cationic bistyrylphenyl fluorescent whitening agent is that having the formula:

(21)

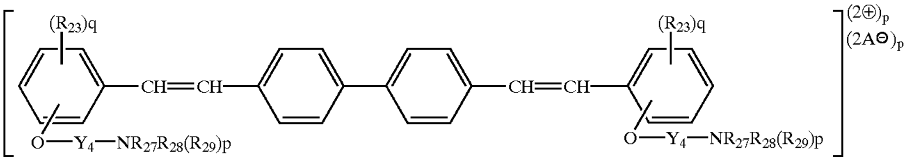

(19)

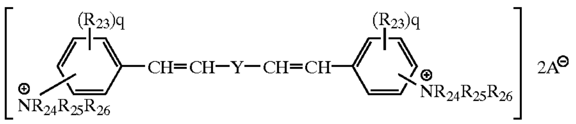

in which Y is arylene, preferably 1,4-phenylene or 4,4'-phenylene, each optionally substituted by (chloro, methyl or methoxy; q is 1 or 2; $R_{23}$ is hydrogen, chloro, $C_1$–$C_4$-alkyl, $C_1$–$C_4$-alkoxy, cyano or $C_1$–$C_4$-alkoxycarbonyl; $R_{24}$ and $R_{25}$ are $C_1$–$C_4$-alkyl, chloroethyl, methoxyethyl, β-ethoxyethyl, β-acetoxyethyl or β-cyanoethyl, benzyl or phenylethyl; $R_{26}$ is $C_1$–$C_4$-alkyl, $C_2$–$C_3$-hydroxyalkyl, β-hydroxy-γ-chloropropyl, β-cyanoethyl car $C_1$–$C_4$-alkoxycarbonylethyl; and A is an anion, preferably the chloride, bromide, iodide, methosulfate, ethosulfate, benzenesulfonate or p-toluenesulfonate anion when $R_{26}$ is $C_1$–$C_4$-alkyl or A is preferably the formate, acetate, propionate or benzoate anion when $R_{26}$ is β-hydroxy-γ-chloropropyl, β-cyanoethyl or $C_1$–$C_4$-alkoxy-carbonylethyl.

Preferred compounds of formula (19) are those in which Y is 1,4phenylene or 4,4-diphenylene; $R_{23}$ is hydrogen, in which $R_{23}$ and q have their previous significance; $Y_4$ is $C_2$–$C_4$-alkylene or hydroxypropylene; $R_{27}$ is $C_1$–$C_4$-alkyl or, together with $R_{28}$ and the nitrogen to which they are each attached, $R_{27}$ forms a pyrrolidine, piperidine, hexamethyleneimine or morpholine ring; $R_{28}$ is $C_1$–$C_4$-alkyl or, together with $R_{27}$ and the nitrogen to which they are each attached, $R_{28}$ forms a pyrrolidine, piperidine, hexamethyleneimine or morpholine ring; $R_{29}$ is hydrogen, $C_1$–$C_4$-alkyl, $C_3$–$C_4$-alkenyl, $C_1$–$C_4$-akoxycarbonylmethyl, benzyl, $C_2$–$C_4$-hydroxyalkyl, $C_2$–$C_4$-cyanoalkyl or, together with $R_{27}$ and $R_{28}$ and the nitrogen atom to which they are each attached, $R_{29}$ forms a pyrrolidine, piperidine, hexamethyleneimine or morpholine ring; A has its previous significance; and p is 0 or 1.

Preferred compounds of formula (21) are those in which q is 1; $R_{23}$ is hydrogen, chlorine, $C_1$–$C_4$-alkyl or $C_1$–$C_4$-alkoxy; $Y_4$ is $(CH_2)_2$; $R_{27}$ and $R_{28}$ are the same and each is methyl or ethyl; $R_{29}$ is methyl or ethyl; p is 1; and A is $CH_3OSO_3$ or $C_2H_5OSO_3$.

The compounds of formula (21) and their production are described in U.S. Pat. No. 4,339,393.

A further preferred class of cationic bistyrylphenyl fluorescent whitening agent is that having the formula:

(22)

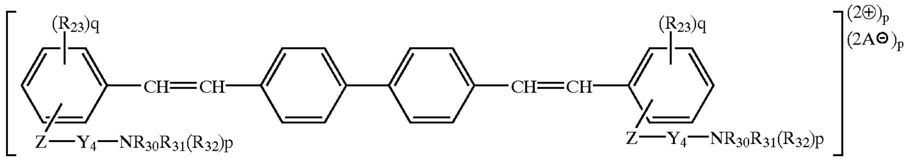

methyl or cyano; $R_{24}$ and $R_{25}$ are each methyl or cyano; and $R_{26}$ and A have their previously indicated preferred meanings.

One particularly preferred compound of formula (19) is that having the formula:

in which $R_{23}$, $Y_4$, A, p and q have their previous significance; $R_{30}$ and $R_{31}$, independently, are $C_1$–$C_4$-alkyl or $C_2$–$C_3$-alkenyl or $R_{30}$ and $R_{31}$, together with the nitrogen atom to which they are attached, form a pyrrolidine, piperidine, hexamethyleneimine or morpholine ring; $R_{32}$ is hydrogen, $C_1$–$C_4$-alkyl or $C_2$–$C_3$-alkenyl or $R_{30}$, $R_{31}$ and $R_{32}$, together with the nitrogen atom to which they are attached, form a pyridine or picoline ring; and Z is sulfur, —$SO_2$—, —$SO_2NH$—, —O—$C_1$–$C_4$-alkylene-COO— or —OCO—.

Preferred compounds of formula (22) are those in which $R_{23}$ is hydrogen, chlorine, $C_1$–$C_4$-alkyl or $C_1$–$C_4$-alkoxy; $R_{30}$ and $R_{31}$, independently, are $C_1$–$C_4$-alkyl or, together with the nitrogen atom to which they are attached, form a pyrrolidine, piperidine or morpholine ring; $R_{32}$ is hydrogen, $C_1$–$C_4$-alkyl or $C_3$–$C_4$-alkenyl or $R_{30}$, $R_{31}$ and $R_{32}$, together with the nitrogen atom to which they are attached, form a pyridine ring; and Z is sulfur, —$SO_2$— or —$SO_2NH$—,.

The compounds of formula (22) and their production are described in U.S. Pat. No. 4,486,352.

A further preferred class of cationic bistyrylphenyl fluorescent whitening agent is that having the formula:

(23)

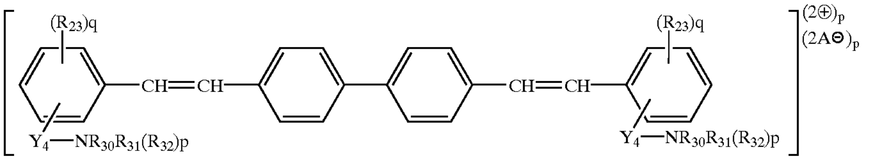

in which $R_{23}$, $R_{30}$, $R_{31}$, $R_{32}$, $Y_4$, A, p and q have their previous significance.

Preferred compounds of formula (23) are those in which q is 1; $R_{23}$ is hydrogen, chlorine, $C_1$–$C_4$-alkyl or $C_1$–$C_4$-alkoxy; $R_{30}$ and $R_{31}$, independently, are $C_1$–$C_4$-alkyl or, together with the nitrogen atom to which they are attached, form a pyrrolidine, piperidine or morpholine ring; $R_{32}$ is hydrogen, $C_1$–$C_4$-alkyl or $C_3$–$C_4$-alkenyl or $R_{30}$, $R_{31}$ and $R_{32}$, together with the nitrogen atom to which they are attached, form a pyridine ring.

The compounds of formula (23) and their production are described in U.S. Pat. No. 4,602,087.

One preferred class of amphoteric styrene fluorescent whitening agent is that having the formula:

(24)

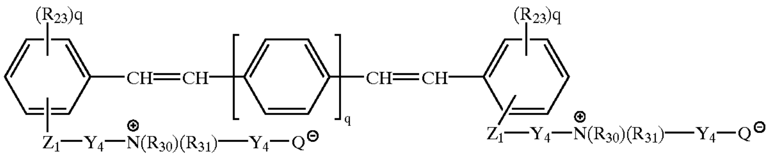

in which $R_{23}$, $R_{30}$, $R_{31}$, $Y_4$ and q have their previous significance and $Z_1$ is oxygen, sulfur, a direct bond, —COO—, —CON($R_{32}$)— or —$SO_2N(R_{32})$— in which $R_{32}$ is hydrogen, $C_1$–$C_4$-alkyl or cyanoethyl; and Q is —COO— or —$SO_3$.

Preferred compounds of formula (24) are those in which $Z_1$ is oxygen, a direct bond, —CONH—, —$SO_2NH$— or —COO—, especially oxygen; q is 1; $R_{30}$ is hydrogen, $C_1$–$C_4$-alkyl, methoxy or chlorine; and $R_{31}$, $R_{32}$, $Y_4$ and Q have their previous significance.

The compounds of formula (24) and their production are described in U.S. Pat. No. 4,478,598.

One preferred class of amine oxide fluorescent whitening agent is that having the formula:

(25)

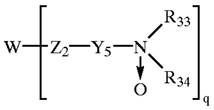

in which q has its previous significance; W is a whitener radical selected from a 4,4'-distyrylbiphenyl, 4,4'-divinylstilbene, and a 1,4'-distyrylbenzene, each optionally substituted by one to four substituents selected from halogen, $C_1$–$C_4$alkyl, $C_1$–$C_4$-hydroxyalkyl, $C_1$–$C_4$-halogenoalkyl, $C_1$–$C_4$-cyanoalkyl, $C_1$–$C_4$-alkoxy-$C_1$–$C_4$-alkyl, phenyl-$C_1$–$C_4$-alkyl, carboxy-$C_1$–$C_4$-alkyl, carb-$C_1$–$C_4$-alkoxy-$C_1$–$C_4$-alkyl, $C_1$–$C_4$-alkenyl, $C_5$–$C_8$-cycloalkyl, $C_1$–$C_4$-alkoxy, $C_1$–$C_4$alkenoxy, $C_1$–$C_4$-alkoxycarbonyl, carbamoyl, cyano, $C_1$–$C_4$-alkyl-sulfonyl, phenylsulfonyl, $C_1$–$C_4$-alkoxysulfonyl, sulfamoyl, hydroxyl, carboxyl, sulfo and trifluoromethyl, $Z_2$ is a direct bond between B and $Y_5$, an oxygen atom, a sulfur atom, —$SO_2$—, —$SO_2$—O—, —COO—, —CON($_{35}$)— or —$SO_2N(R_{35})$— in which $R_{35}$ is hydrogen or $C_1$–$C_4$-alkyl optionally substituted by halogen, cyano, hydroxyl, $C_2$–$C_5$-carbalkoxy, $C_1$–$C_4$-alkoxy, phenyl, chlorophenyl, methylphenyl, methoxyphenyl, carbamoyl or sulfamoyl; $Y_5$ is $C_2$–$C_4$-alkylene or $C_2$–$C_4$-alkyleneoxy-$C_2$–$C_4$-alkylene, each optionally substituted by halogen, hydroxyl, $C_2$–$C_4$-carbalkoxy, $C_1$–$C_4$-alkoxy, phenyl, chlorophenyl, methylphenyl, methoxyphenyl, carbamoyl or sulfamoyl; and $R_{33}$ and $R_{34}$, independently, are $C_5$–$C_8$-cycloalkyl, $C_1$–$C_4$-alkyl or phenyl, each optionally substituted by halogen, hydroxyl, $C_2$–$C_5$-carbalkoxy, $C_1$–$C_4$-alkoxy, phenyl, chlorophenyl, methylphenyl, methoxyphenyl, carbamoyl or sulfamoyl; in which, in all the carbamoyl or sulfamoyl groups, the nitrogen atom is optionally substituted by one or two $C_1$–$C_4$-alkyl, $C_1$–$C_4$-hydroxyalkyl, $C_2$–$C_5$-cyanoalkyl, $C_1$–$C_4$-halogenoalkyl, benzyl or phenyl groups.

Preferred whitener radicals W are those having the formula:

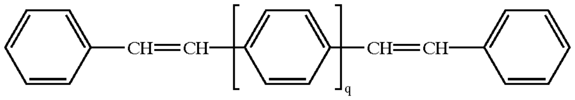

in which q has its previous significance and the rings are optionally substituted as indicated above.

Preferably $Z_2$ is oxygen, —$SO_2$— or —$SO_2N(R_{36})$— in which $R_{36}$ is hydrogen or $C_1$–$C_4$-alkyl optionally substituted by hydroxyl, halogen or cyano; and $R_{33}$ and $R_{34}$, independently, are $C_1$–$C_4$-alkyl optionally substituted by halogen, cyano, hydroxyl, $C_1$–$C_4$-alkoxy, phenyl, chlorophenyl, methylphenyl, methoxyphenyl or $C_1$–$C_5$-alkoxycarbonyl. Other preferred compounds of formula (25) are those in which $Z_2$ is oxygen, sulfur, —$SO_2$—, —CON($R_{36}$)— or —$SO_2N(R_{36})$— in which $R_{36}$ is hydrogen or $C_1$–$C_4$-alkyl optionally substituted by hydroxyl, halogen or cyano; and $Y_5$ is $C_1$–$C_4$-alkylene.

The compounds of formula (25) and their production are described in U.S. Pat. No. 4,539,161.

One preferred class of cationic phosphinic acid salt fluorescent whitening agent is that having the formula:

(26)

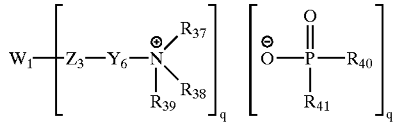

in which q has its previous significance; $W_1$ is whitener radical; $Z_3$ is a direct bond, —$SO_2$—$C_1$–$C_4$-alkyleneoxy, —$SO_2$—$C_2$–$C_4$-alkylene-COO—, —$SO_2$—, —COO—, —$SO_2$—$C_2$–$C_4$-alkylene-CON($R_{42}$)— or —$SO_2N(R_{42})$— in which $R_{42}$ is hydrogen or $C_1$–$C_4$-alkyl, optionally substituted by hydroxyl, halogen or cyano; $R_{37}$ is $C_1$–$C_4$-alkyl or $C_2$–$C_4$-alkenyl, each optionally substituted by halogen, cyano, hyxdroxy, $C_1$–$C_4$-alkoxycarbonyl or $C_1$–$C_4$-alkoxycarbonyloxy, or $R_{37}$ is benzyl, optionally substituted by halogen, $C_1$–$C_4$-alkyl or $C_1$–$C_4$-alkoxy, or $R_{37}$, together with $R_{38}$ or $Z_3$, forms a pyrrolidine, piperidine or morpholine radical; $R_{38}$ is $C_1$–$C_4$-alkyl or $C_2$–$C_4$-alkenyl, each optionally substituted by halogen, cyano, hydroxy, $C_1$–$C_4$-alkoxycarbonyl or $C_1$–$C_4$-alkylcarbonyloxy, or $R_{38}$ is benzyl, optionally substituted by halogen, $C_1$–$C_4$-alkyl or $C_1$–$C_4$-alkoxy, or $R_{38}$, together with $R_{37}$, forms a pyrrolidine, piperidine or morpholine radical; $R_{39}$ is $C_1$–$C_4$-alkyl; $R_{40}$ is hydrogen or $C_1$–$C_4$-alkyl, optionally substituted by cyano, hydroxy, $C_1$–$C_4$-alkoxycarbonyl or $C_1$–$C_4$-alkylcarbonyloxy; and $R_{41}$ is $C_1$–$C_4$-alkyl.

Preferably, whitener radical $W_1$ has the formula:

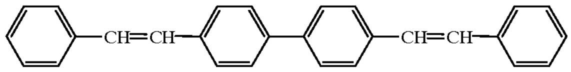

or the formula:

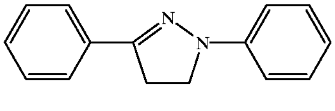

each optionally substituted by one to four substituents selected from halogen, $C_1$–$C_4$-alkyl, $C_1$–$C_4$-hydroxyalkyl, $C_1$–$C_4$-halogenoalkyl, $C_1$–$C_4$-cyanoalkyl, $C_1$–$C_4$-alkoxy-$C_1$–$C_4$-alkyl, phenyl-$C_1$–$C_4$-alkyl, carboxy-$C_1$–$C_4$-alkyl carb-$C_1$–$C_4$alkoxy-$C_1$–$C_4$-alkyl, $C_1$–$C_4$alkenyl, $C_5$–$C_8$-cycloalkyl, $C_1$–$C_4$-alkoxy, $C_1$–$C_4$-alkenoxy, $C_1$–$C_4$-alkoxycarbonyl, carbamoyl, cyano, $C_1$–$C_4$-alkyl-sulfonyl, phenylsulfonyl, $C_1$–$C_4$-alkoxysulfonyl, sulfamoyl, hydroxyl, carboxyl, sulfo and trifluoromethyl.

The compounds of formula (26) and their production are described in GB-A2 023 605.

Preferred bis(triazinyl)diaminostilbene anionic fluorescent whitening agents for use in the present invention are those having the formula:

(27)

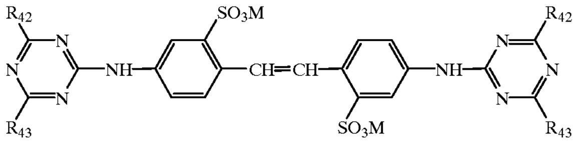

Preferred dibenzofuranylbiphenyl anionic fluorescent whitening agents for use in the present invention are those having the formula:

(28)

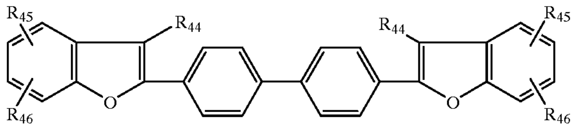

Preferred anionic bistyrylphenyl fluorescent whitening agents for use in the present invention are those having the formula:

(29)

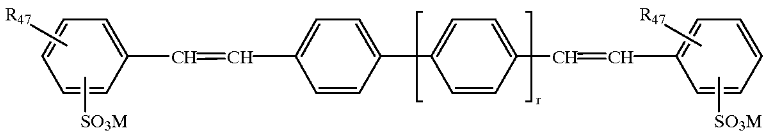

In the formulae (27) to (29), $R_{42}$ is phenyl optionally substituted by one or two $SO_3M$ groups and $R_{43}$ is NH—$C_1$–$C_4$-alkyl, N($C_1$–$C_4$-alkyl)$_2$, NH—$C_1$–$C_4$-alkoxy, N($C_1$–$C_4$-alkoxy)$_2$, N($C_1$–$C_4$-alkyl)($C_1$–$C_4$-hydroxyalkyl), N($C_1$–$C_4$-hydroxyalkyl)$_2$; $R_{44}$ is H, $C_1$–$C_4$-alkyl, CN, Cl or $SO_3M$; $R_{45}$ and $R_{46}$, independently, are H, $C_1$–$C_4$-alkyl, $SO_3M$, CN, Cl or O—$C_1$–$C_4$-alkyl, provided that at least two of $R_{44}$, $R_{45}$ and $R_{46}$ are $SO_3M$ and the third group has solubilising character, $R_{47}$ is H, $SO_3M$, O—$C_1$–$C_4$-alkyl, CN, Cl, COO—$C_1$–$C_4$-alkyl, or CON($C_1$–$C_4$-alkyl)$_2$; M is is H, Na, K, Ca, Mg, ammonium, mono-, di-, tri- or tetra-$C_1$–$C_4$-alkylammonium, mono-, di- or tri-$C_1$–$C_4$-hydroxyalkylammonium or ammonium that is di- or tri-substituted with by a mixture of $C_1$–$C_4$-alkyl and $C_1$—$C_4$-hydroxyalkyl groups; and r is 0 or 1.

In the compounds of formulae (27) to (29), $C_1$–$C_4$-alkyl groups are, e.g., methyl, ethyl, n-propyl, isopropyl and n-butyl, especially methyl. Aryl groups are naphthyl or, especially, phenyl.
Specific examples of preferred compounds of formula (27) are those having the formulae:
(30)
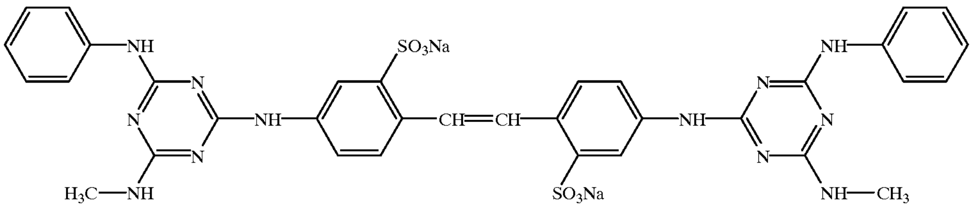
(31)
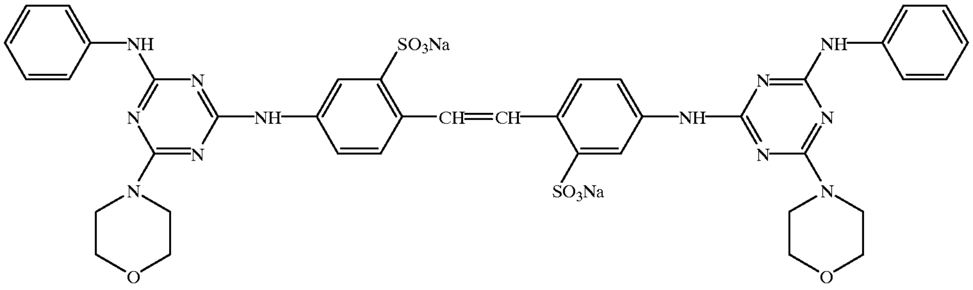
(32)
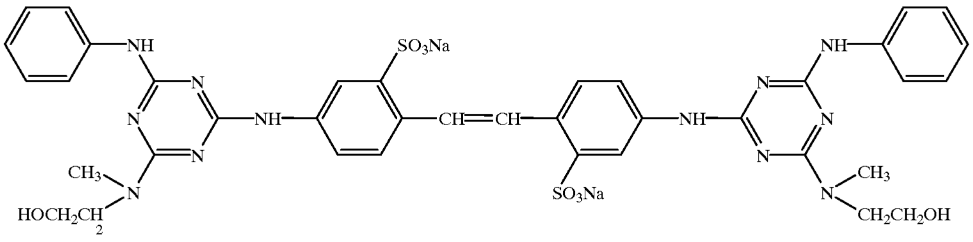
Preferred examples of compounds of formula (28) are those of formulae:
(33)
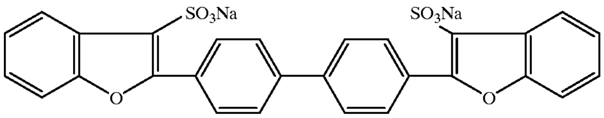
(34)
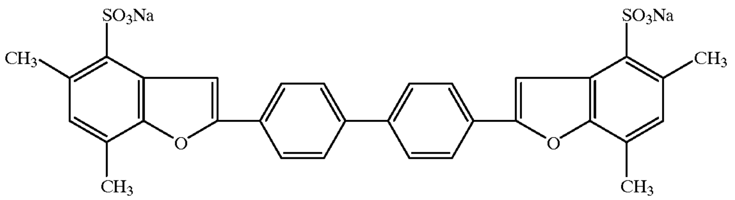
(35)
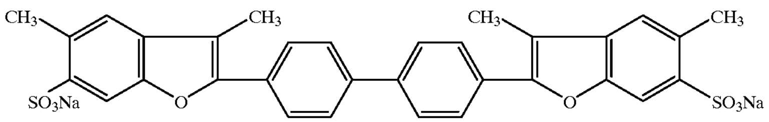

-continued (36)

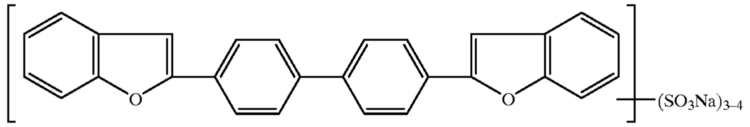

Preferred examples of compounds of formula (29) are those having the formulae:

(37)

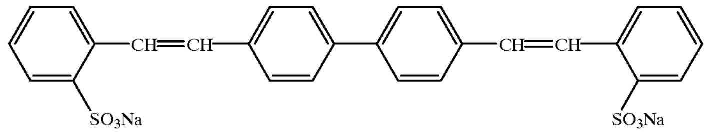

(38)

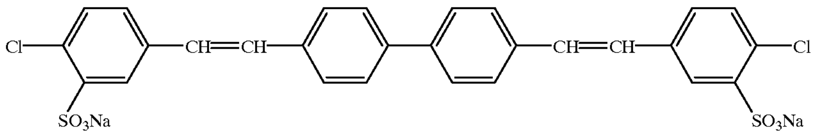

(39)

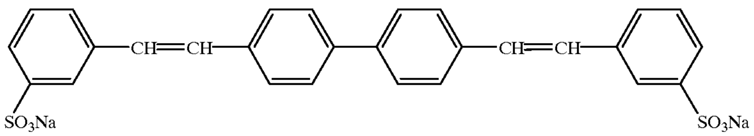

The compounds of formulae (27) to (29) are known and may be obtained by known methods.

The present invention also provides, as a third apect, a method for the treatment of a textile article, in particular to improve its SPF, comprising applying, to a previously washed article, a fabric rinse composition comprising:

a) 0.1 to 20, preferably 1 to 10% by weight of a UV absorber selected from a hydroxyaryl-1,3,5-triazine, a sulphonated-1,3,5-triazine, an o-hydroxyphenylbenzotriazole or a 2-aryl-2H-benzotriazole, based on the total weight of the composition;

b) a fabric care ingredient; and c) the remainder being substantially water.

Preferably, the fabric care ingredient is a fabric softener, a stain release or stain repellant ingredient or a water-proofing agent, which is preferably present in an amount of from 5 to 25%, especially from 10 to 20% by weight, based on the total weight of the composition.

A preferred method for the treatment of a textile article, in particular to improve its SPF, comprises applying, to the previously washed article, a rinse cycle fabric softener composition comprising:

a) 0.05 to 5, preferably 0.1 to 1.5% by weight of a UV absorber selected from a hydroxyaryl-1,3,5-triazine, a sulphonated-1,3,5-triazine, an o-hydroxyphenylbenzotriazole or a 2-aryl-2H-benzotriazole, based on the total weight of the composition;

b) 5 to 25preferably 10 to 20% by weight of a cationic fabric softening agent, based on the total weight of the composition; and c) the remainder being substantially water.

The textile article treated according to the method of the present invention may be composed of any of a wide range of types of fibre such as wool, polyamide, cotton, polyester, polyacrylic, silk or any mixture thereof.

The method and composition of the present invention, in addition to providing protection to the skin, also increase the useful life of a textile article treated according to the present invention, for example by preserving its tear strength and/or its lightfastness.

The following Examples further illustrate the present invention.

EXAMPLE 1

The following rinse cycle softener base composition is made up:

6.7 g distearyldimethylammonium chloride 0.5 g fatty alcohol ethoxylate 87.8 g water The composition so obtained has a pH value of 4.8.

To this composition is added 5.0 g of the UV absorber having the formula:

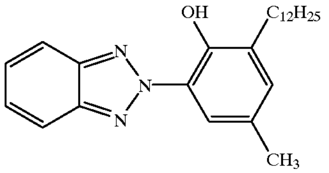

The composition so obtained has a pH value of 4.6.

EXAMPLE 2

The following rinse cycle softener base composition is made up:

22.2 g methyl bis(tallow-amidomethyl)-2-hydroxyethylammonium methylsulphate 0.5 g calcium chloride 0.6 g 10% w/w aqueous solution of citric acid 71.68 g water The composition so obtained has a pH value of 4.1.

To this composition is added 5.0 g of the UV absorber having the formula:

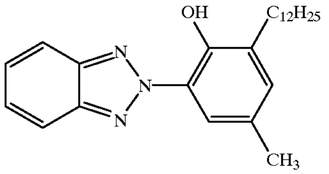

The composition so obtained has a pH value of 4.3.

EXAMPLE 3

20 g of wool serge textile are washed/rinsed in a laboratory washing machine using a liquor ratio of 1:20 and a total volume of wash/rinse liquor of 400 mls. The wash/rinse liquor contains sufficient of the composition of Example 1 to make available 1% by weight of the UV absorber, based on the weight of the textile.

The wash/rinse liquor is heated to 40° C. and held at this temperature for 30 minutes. The level of exhaustion of the UV absorber on to the textile is then determined spectrophotometrically and is found to be 46%. The SPF of the washed/rinsed textile is 52. The SPF of textile washed/rinsed with a wash/rinse liquor containing no UV absorber is 22.

If the pH value of the composition of Example 1 is first adjusted to 8.5by the addition of sufficient 10% caustic soda solution, and the washing/rinsing test is then conducted, the level of exhaustion of the UV absorber on to the textile is then 53% and the SPF is 62.

The Sun Protection Factor (SPF) is determined by measurement of the UV light transmitted through the textile, using a double grating spectrophotometer fitted with an Ulbricht bowl. Calculation of SPF is conducted as described by B. L. Diffey and J. Robson in J. Soc. Cosm. Chem. 40 (1989), pp. 130–131.

Similar improvements in the SPF values of treated textiles are obtained when the UV absorber having the formula:

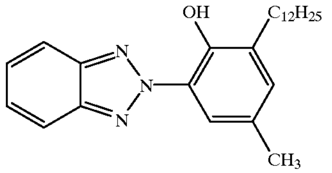

is replaced by a UV absorber having one of the formulae:

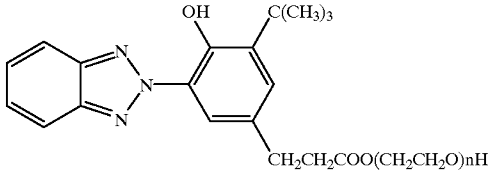

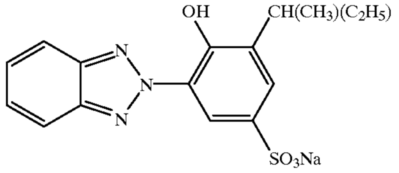

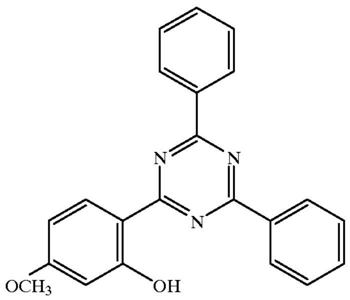

or

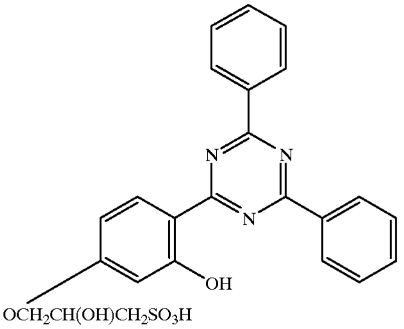

EXAMPLE 4

20 g of wool serge textile are washed/rinsed in a laboratory washing machine using a liquor ratio of 1:20 and a total volume of wash/rinse liquor of 400 mls. The wash/rinse liquor contains sufficient of the composition of Example 1 to make available 1% by weight of the UV absorber, based on the weight of the textile.

The wash/rinse liquor is heated to 40° C. and held at this temperature for 30 minutes. The level of exhaustion of the UV absorber on to the textile is then determined spectrophotometrically and is found to be 44%. The SPF of the washed/rinsed textile is 67. The SPF of textile washed/rinsed with a wash/rinse liquor containing no UV absorber is 24.

If the pH value of the composition of Example 1 is first adjusted to 8.5, by the addition of sufficient 10% caustic soda solution, and the washing/rinsing test is then conducted, the level of exhaustion of the UV absorber on to the textile is again 44% and the SPF is 86.

Similar results are obtained if the wool serge textile is replaced by a polyamide or polyester textile.

Similar improvements in the SPF values of treated textiles are obtained when the UV absorber having the formula:

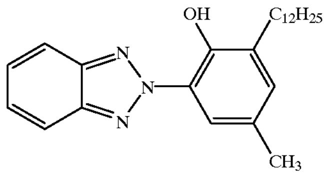

is replaced by a UV absorber having one of the formulae:

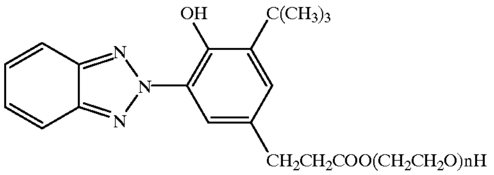

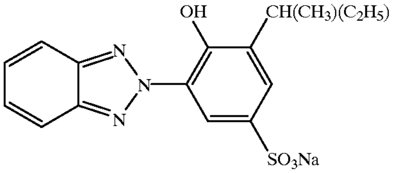

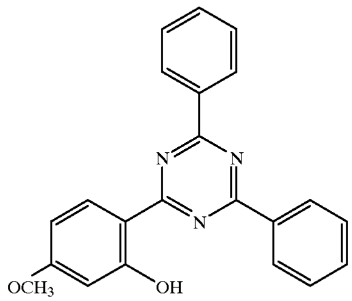

or

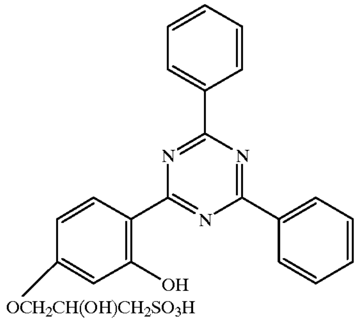

EXAMPLE 5

The following rinse cycle softener base composition is made up:

6.7 g distearyldimethylammonium chloride 0.5 g fatty alcohol ethoxylate 86.8 g water The composition so obtained has a pH value of 4.8.

To this composition is added 5.0 g of the UV absorber having the formula:

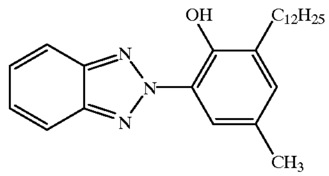

and 1.0 g of the fluorescent whitening agent of formula:

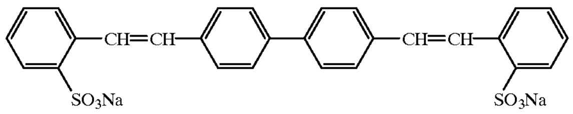

The composition so obtained has a pH value of 5.2.

EXAMPLE 6

20 g of cotton cretonne textile are washed/rinsed in a laboratory washing machine using a liquor ratio of 1:20 and a total volume of wash/rinse liquor of 400 mls. The wash/rinse liquor contains sufficient of the composition of Example 5 to make available 1% by weight of the UV absorber and 0.2% of the fluorescent whitening agent, each based on the weight of the textile.

The wash/rinse liquor is heated to 40° C. and held at this temperature for 30 minutes. The SPF of the washed/rinsed textile is 20. The SPF of textile washed/rinsed with a wash/rinse liquor containing no UV absorber or fluorescent whitening agent is 3.6.

What is claimed is:

1. A stable, concentrated fabric rinse composition comprising:

a) 0.1 to 20% by weight of a UV absorber selected from a hydroxyaryl-1,3,5-triazine or a sulphonated-1,3,5-triazine, based on the total weight of the composition;

b) a fabric care ingredient which is a cationic fabric softener, a stain release or stain repellant ingredient or a water-proofing agent; and c) the remainder being substantially water.

2. A composition according to claim 1 comprising:

a) 1 to 10% by weight of a UV absorber selected from a hydroxyaryl-1,3,5-triazine or a sulphonated-1,3,5-triazine, based on the total weight of the composition;

b) a fabric care ingredient:; and c) the remainder being substantially water.

3. A composition according to claim 1 in which the fabric care ingredient is present in an amount of from 5 to 25% by weight, based on the total weight of the composition.

4. A composition according to claim 3 in which the fabric care ingredient is present in an amount of from 10 to 20% by weight, based on the total weight of the composition.

5. A composition according to claim 1 in which the fabric care ingredient is a cationic fabric softener.

6. A composition according to claim 5 in which the cationic fabric softening agent is an imidazoline, a quaternary ammonium compound or a mixture thereof.

7. A composition according to claim 6 in which the imidazoline cationic fabric softening agent has the formula:

(1)

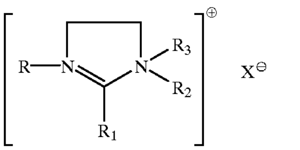

in which R is hydrogen or $C_1$–$C_4$alkyl; $R_1$ is a $C_8$–$C_{30}$aliphatic residue; $R_2$ is hydrogen, a $C_8$–$C_{30}$aliphatic residue, $C_1$–$C_4$alkyl, $C_1$–$C_4$halogenoalkyl, $C_1C_4$hydroxyalkyl or a group —$C_2H_4$—OC(=O)—$R_5$ or —$C_2H_4$—N($R_4$)—C(=O)—$R_5$ in which $R_4$ is hydrogen or $C_8$–$C_{30}$alkyl and $R_5$ is hydrogen or $C_1$–$C_4$alkyl; $R_3$ is a $C_8$–$C_{30}$aliphatic residue, $C_1$–$C_4$alkyl, $C_1$–$C_4$halogenoalkyl, $C_1$–$C_4$hydroxyalkyl or a group —$C_2H_4$—OC(=O)—$R_5$ or —$C_2H_4$—N($R_4$)—C(=O)—$R_5$ in which $R_4$ and $R_5$ have their previous significance; and X is an anion.

8. A composition according to claim 7 in which R is hydrogen or methyl; $R_1$ is $C_{14}$–$C_{18}$alkyl or $C_{14}$–$C_{18}$alkenyl; $R_2$ is hydrogen, $C_{14}$–$C_{18}$alkyl, $C_{14}$–$C_{18}$alkenyl, $C_1$–$C_4$alkyl, $C_1$–$C_4$halogenoalkyl or $C_1$–$C_4$hydroxyalkyl; and $R_3$ is a group —$C_2H_4$—OC(=O)—$R_5$ or —$C_2H_4$—N($R_4$)—C(=O)—$R_5$ in which $R_4$ is hydrogen or $C_8$–$C_{30}$alkyl and $R_5$ is hydrogen or $C_1$–$C_4$alkyl.

9. A composition according to claim 6 in which the quaternary ammonium compound has the formula:

(2)

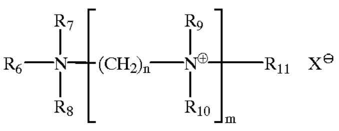

in which $R_6$ is a $C_8$–$C_{30}$aliphatic residue, $R_7$, $R_8$, $R_9$, $R_{10}$ and $R_{11}$, independently, are hydrogen, $C_1$–$C_4$alkyl or $C_1$–$C_4$hydroxyalkyl, X is an anion, m is an integer from 1 to 5 and n is an integer from 2 to 6.

10. A composition according to claim 9 in which $R_6$ is $C_{12}$–$C_{18}$alkyl and $R_7$, $R_8$, $R_9$, $R_{10}$ and $R_{11}$, independently, are $C_1$–$C_4$alkyl.

11. A composition according to claim 10 in which $R_7$, $R_8$, $R_9$, $R_{10}$ and $R_{11}$, independently, are methyl.

12. A composition according to claim 6 in which the quaternary ammonium compound has the formula:

(3)

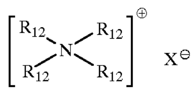

in which X is an anion and the groups $R_{12}$ are the same or different and each is a $C_1$–$C_{30}$aliphatic residue, provided that at least one group $R_{12}$ is $C_{14}$–$C_{30}$alkyl.

13. A composition according to claim 12 in which two groups $R_{12}$ are $C_{14}$–$C_{30}$alkyl.

14. A composition according to claim 12 in which the remaining groups $R_{12}$ are $C_1$–$C_4$alkyl.

15. A composition according to claim 14 in which the remaining groups $R_{12}$ are methyl or ethyl.

16. A composition according to claim 7 in which X is a chloride, bromide, iodide, fluoride, sulfate, methosulfate, nitrite, nitrate or phosphate anion, or a carboxylate anion.

17. A composition according to claim 16 in which the carboxylate anion is an acetate, adipate, phthalate, benzoate, stearate or oleate anion.

18. A composition according to claim 7 in which the compound of formula (1) is:

2-tallow-1-(2-stearoyloxyethyl)-imidazoline chloride,
2-tallow-1-(2-stearoyloxyethyl)-imidazoline sulfate,
2-tallow-1-(2-stearoyloxyethyl)-imidazoline methosulfate,
2-tallow-1-methyl-3-(2-stearoylamidoethyl)-imidazoline chloride,
2-tallow-1-methyl-3-(2-stearoylamidoethyl)-imidazoline sulfate,
2-tallow-1-methyl-3-(2-stearoylamidoethyl)-imidazoline methosulfate,
2-heptadecyl-1-methyl-1-oleylamidoethyl-imidazolinium-metho-sulfate,
2-heptadecyl-1-methyl-1-(2-stearoylamido)ethyl-imidazolinium-sulfate,
2-heptadecyl-1-methyl-1-(2-stearoylamido)ethyl-imidazolinium-chloride
2-coco-1-(2-hydroxyethyl)-1-benzyl-imidazolinium-chloride
2-coco-1-(2-hydroxyethyl)-1-(4-chlorobutyl)-imidazolinium-chloride
2-coco-1-(2-hydroxyethyl)-1-octadecenyl-imidazolinium-chloride
2-tallow-1-(2-hydroxyethyl)-1-benzyl-imidazolinium-chloride
2-tallow-1-(2-hydroxyethyl)-1-(4-chlorobutyl)-imidazolinium-chloride
2-heptadecenyl-1-(2-hydroxyethyl)-1-(4-chlorobutyl)-imidazolinium-chloride
2-heptadecenyl-1-(2-hydroxyethyl)-1-benzyl-imidazolinium-chloride or
2-heptadecenyl-1-(2-hydroxyethyl)-1-octadecyl-imidazolinium-chloride.

19. A composition according to claim 9 in which the compound of formula (2) is:

N-(tallow)-N,N,N',N'-tetramethyl-1,3-propanediammoniumdimethosulfate
N-(tallow)-N,N'N'-trimethyl-1,3-propanediammoniumdimetho sulfate
N-(tallow)-N,N,N',N',N'-pentamethyl-1,3-propanediammoniumdimethosulfate
N-oleyl-N,N,N',N',N'-pentamethyl-1,3-propanediammoniumdimethosulfate
N-stearyl-N,N,N',N',N'-pentamethyl-1,3-propanediammoniumdimethosulfate or
N-stearyloxypropyl-N,N',N'-tris(3-hydroxypropyl)-1,3-propanediammoniumdiacetate.

20. A composition according to claim 12 in which the compound of formula (3) is:

distearyldimethylammonium chloride
dilauryldimethylammonium chloride
dihexadecyldimethylammonium chloride
distearyldimethylammonium bromide
distearyldimethylammonium methosulfate or
distearyldi-(isopropyl)-ammonium chloride.

21. A composition according to claim 1 in which the UV absorber is a triazine UV absorber having the formula:

(4)

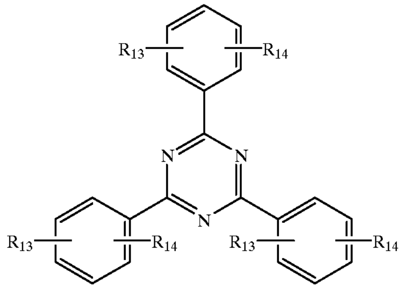

in which $R_{13}$ and $R_{14}$, independently, are hydrogen, hydroxy or $C_1$–$C_5$alkoxy.

22. A composition according to claim 1 in which the UV absorber is a triazine UV absorber having the formula:

(5)

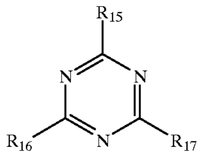

in which at least one of $R_{15}$, $R_{16}$ and $R_{17}$ is a radical of formula:

(6)

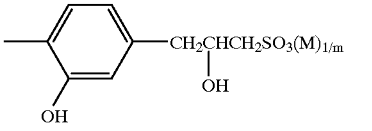

in which M is hydrogen, sodium, potassium, calcium, magnesium, ammonium, mono-, di-, tri- or tetra-$C_1$–$C_4$alkylammonium, mono, di- or tri-$C_1$–$C_4$hydroxyalkylammonium or ammonium that is di- or ti-substituted by a mixture of $C_1$–$C_4$alkyl and $C_1$–$C_4$hydroxyalkyl groups; m is 1 or 2; and the remaining substituent(s) $R_{15}$, $R_{16}$ and $R_{17}$ are, independently, amino, $C_1$–$C_{12}$alkyl, $C_1$–$C_{12}$alkoxy, $C_1$–$C_{12}$alkylthio, mono- or di-$C_1$–$C_{12}$alkylamino, phenyl, phenylthio, anilino or N-phenyl-N-$C_1$–$C_4$alkylamino, the respective phenyl substituents being optionally substituted by $C_1$–$C_{12}$alkyl or -alkoxy, $C_5$–$C_8$cycloalkyl or halogen.

23. A composition according to claim 1 in which the UV absorber is a triazine UV absorber having the formula:

(7)

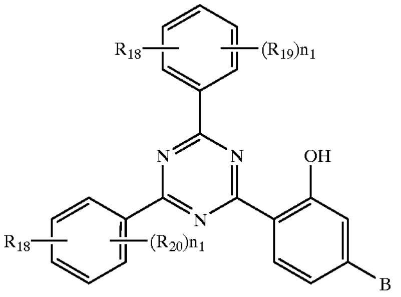

in which $R_{18}$ is hydrogen or hydroxy; $R_{19}$ and $R_{20}$, independently, are hydrogen or $C_1$–$C_4$alkyl; $n_1$ is 1 or 2; and B is a group of formula:

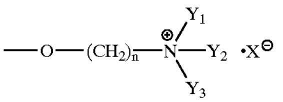

in which n is as defined in claim 1; $Y_1$ and $Y_2$, independently, are $C_1$–$C_4$alkyl optionally substituted by halogen, cyano, hydroxy or $C_1$–$C_4$alkoxy or $Y_1$ and $Y_2$, together with the nitrogen atom to which they are each attached, form a 5–7 membered heterocyclic ring; $Y_3$ is hydrogen, $C_3$–$C_4$alkenyl or $C_1$–$C_4$alkyl optionally substituted by cyano, hydroxy or $C_1$–$C_4$alkoxy or $Y_1$, $Y_2$ and $Y_3$, together with the nitrogen atom to which they are each attached, form a pyridine or picoline ring; and $X_1^{\ominus}$ is a colourless anion.

24. A composition according to claim 23 in which $X_1^{\ominus}$ is $CH_3OSO_3^{\ominus}$ or $C_2H_5OSO_3^{\ominus}$.

25. A composition according to claim 21 in which the triazine compound has the formula:

(11)

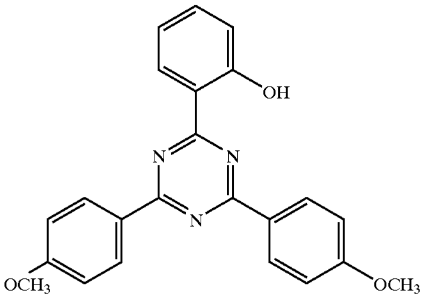

(12)

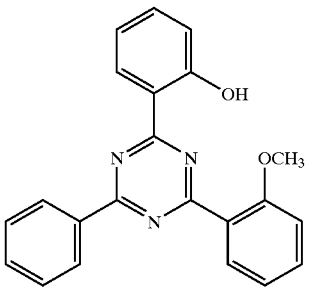

-continued (13)

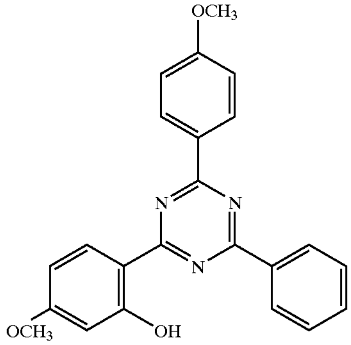

(14)

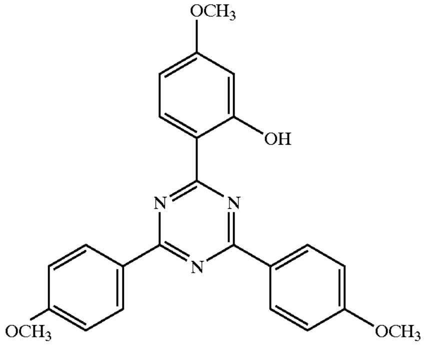

(15)

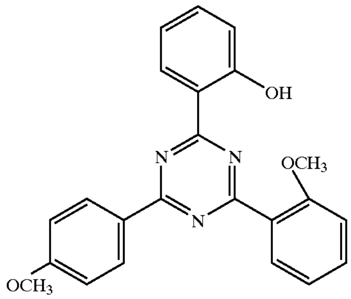

(16)

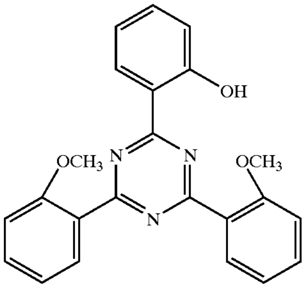

(17)

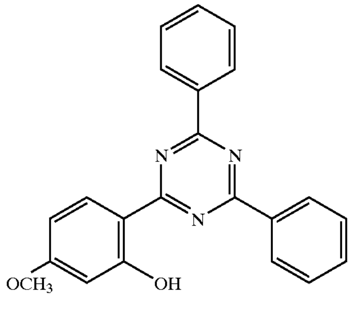

26. A composition according to claim 22 in which the UV absorber is a triazine UV absorber having the formula:

(18)

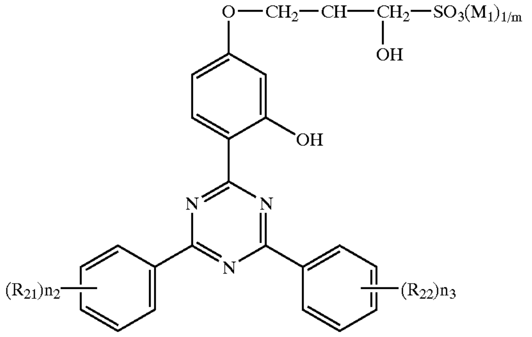

in which $R_{21}$ and $R_{22}$, independently, are $C_1$–$C_{12}$alkyl; m is 1 or 2; $M_1$ is hydrogen, sodium, potassium, calcium, magnesium, ammonium or tetra-$C_1$–$C_{12}$alkylammonium; and $n_1$ and $n_2$, independently, are 0, 1 or 2.

27. A composition according to claim 26 in which $R_{21}$ and $R_{22}$, independently, are methyl; m is 1 or 2; $M_1$ is hydrogen; and $n_1$ and $n_2$, independently, are 1 or 2.

28. A composition according to claim 1 which also contains an adjuvant selected from an emulsifier, perfume, colouring dye, opacifier, fluorescent whitening agent, bactericide, nonionic surfactant, anti-gelling agent and corrosion inhibitor.

29. A composition according to claim 28 in which the adjuvant is a fluorescent whitening agent.

30. A method for the treatment of a textile article, comprising applying, to a previously washed article, a fabric rinse composition comprising:

a) 0.1 to 20% by weight of a UV absorber selected from a hydroxyaryl-1,3,5-triazine or a sulphonated-1,3,5-triazine, based on the total weight of the composition;

b) a fabric care ingredient which is a cationic fabric softener, a stain release or stain repellant ingredient or a water-proofing agent; and c) the remainder being substantially water.

31. A method according to claim 30 in which the fabric care ingredient is present in an amount of from 5 to 25% by weight, based on the total weight of the composition.

32. A method according to claim 31 which the fabric care ingredient is present in an amount of from 10 to 20% by weight, based on the total weight of the composition.

33. A method according to claim 30 in which the fabric care ingredient is a fabric softener.

34. A method for the treatment of a textile article, comprising applying, to a previously washed article, a rinse cycle fabric softener composition comprising:

a) 0.05 to 5% by weight of a UV absorber selected from a hydroxyaryl-1,3,5-triazine or a sulphonated-1,3,5-triazine, based on the total weight of the composition;

b) 5 to 25% by weight of a cationic fabric softening agent, based on the total weight of the composition; and c) the remainder being substantially water.

35. A method according to claim 34 in which the rinse cycle fabric softener composition comprises:

a) 0.1 to 1.5% of the UV absorber 2-aryl-2H-benzotriazole;

b) 10 to 20% by weight of a cationic fabric softening agent, each based on the total weight of the composition; and c) the remainder being substantially water.

36. A method according to claim 34 in which the textile article treated is composed of wool, polyamide, cotton, polyester, polyacrylic, silk or any mixture thereof.

37. A method according to claim 30 in which the SPF value of the treated textile article is improved.

38. A method according to claim 30 in which the tear strength and/or the lightfastness of the treated textile article is improved.

* * * * *